_United States Patent_ [19]

Beavers

[11] Patent Number: 5,000,410
[45] Date of Patent: Mar. 19, 1991

[54] HOLDER FOR EYE GLASSES MOUNTED ON INTERIOR PORTION OF AN AUTOMOBILE OR OTHER ITEM

[76] Inventor: Carol J. Beavers, 1111 Lincoln, Lockport, Ill. 60441

[21] Appl. No.: 422,169

[22] Filed: Oct. 16, 1989

[51] Int. Cl.$^5$ ............................................... A47F 5/00
[52] U.S. Cl. ..................... 248/205.3; 24/3 E; 248/902
[58] Field of Search ............... 248/683, 684, 205.3, 248/205.2, 902; 211/13, 87; 24/3 C, 3 R, 3 E, 306

[56] References Cited

U.S. PATENT DOCUMENTS

| | | | |
|---|---|---|---|
| 3,148,812 | 9/1964 | Hilsinger, Jr. | 24/3 E |
| 3,259,348 | 7/1966 | Dann | 248/902 X |
| 4,094,021 | 6/1978 | Rapp | 24/306 X |
| 4,239,167 | 12/1980 | Lane | 248/902 X |
| 4,695,026 | 9/1987 | Medley, Jr. | 248/902 X |
| 4,771,515 | 9/1988 | Guarro | 24/3 C |
| 4,809,406 | 3/1989 | Tsai | 248/902 X |

_Primary Examiner_—David L. Talbott
_Assistant Examiner_—Daniel Hulseberg

[57] ABSTRACT

A holder for eyeglasses mountable on the interior portion of an automobile, or an other itens such as desks, refrigerators and the like, comprising an elongated panel of a plastic material having a loop projecting outwardly near the bottom to receive the shank of the downwardly extending ear piece portion of the frame which then hangs on the projecting loop at the hinged connection of the ear piece to the eyeglass portion of the frame. A fold-over flap is provided at a lower portion of the elongated plastic panel permanently connected at one edge of the plastic panel to form a flexible hinge, and having Velcro fasteners along the inwardly facing free end of the flap. This fold-over flap is folded over an intermediate portion of the shanks of the ear piece parts of the glasses' frame to keep the glasses in place against the panel of the holder and to keep then stationary. The back side of the plastic panel has an adhesive strip to secure the panel to the dash or other interior portion of the car.

5 Claims, 2 Drawing Sheets

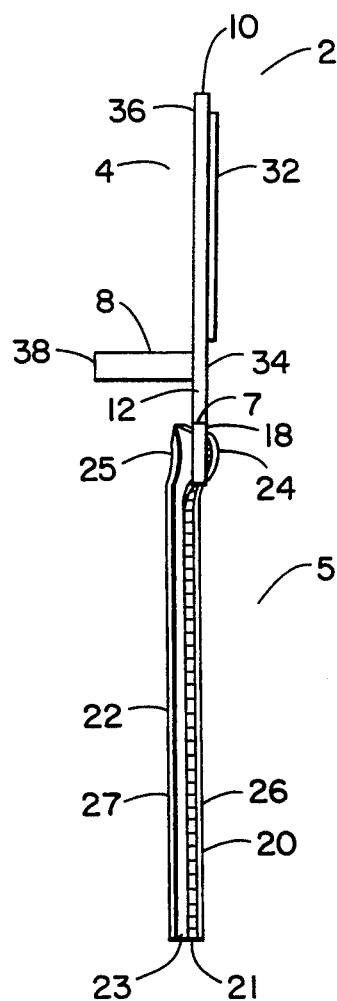
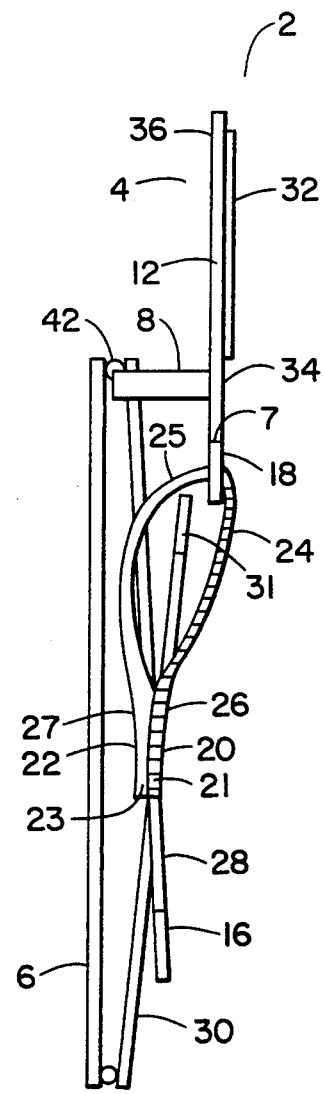

HOLDER FOR EYE GLASSES MOUNTED ON INTERIOR PORTION OF AN AUTOMOBILE OR OTHER ITEM

BACKGROUND OF THE INVENTION

This invention relates to the field of eyeglass holders and in particular to eyeglass holders that attach to the dashboard of a car thereby allowing quick access to glasses while keeping the drivers attention focused upon the road. The eyeglass holders can also be attached to other items such as desks, refrigerators, clothing, and the like.

Prior art eyeglass holders for attachment to a car's interior have been aimed at attaching the eyeglass holders to the sun visor or the rear view mirror or the attaching means utilized to connect the holder of the car's interior are bulky or limited to a flat smooth surface.

The problem with prior art eyeglass holders for attachment to a car's interior is that they distract the driver's attention, or block out part of his viewing area, because of the eyeglass holders attaching designs utilizing the rear view mirror, windshield or sun visor for a mounting surface. Another problem with prior art eyeglass holders is that the size of the attaching means is too large for the limited space on a car's dashboard especially with smaller compact cars. Another problem with prior art eyeglass holders is that the attaching means utilized are limited with respect to the type of surface the holders can be attached.

Examples of prior art devices includes those disclosed in the following United States Patents:

U.S. Pat. No. 4,576,320 discloses an eyeglass holder for use in conjunction with the rear view mirror of an automobile. The eyeglass holder mounts to the top of the rear view mirror. A pair of suction cups adhere to the front windshield of the vehicle with stems connecting the eyeglass holder to the suction cups thereby stabilizing the assembly. The problem with this design is that the eyeglass holders impede the viewing area of the driver and cause a distraction when movement occurs due to excessive vibration caused by a rough road. Another problem with this device is that it requires a rear view mirror for mounting. Vehicles utilizing exterior mounted side mirrors for viewing rearwardly rather than rear view mirrors could not utilize this invention as disclosed in the patent.

U.S. Pat. No. 3,552,701 discloses an eyeglass support that attaches to the support post of a rear view mirror. The ear pieces of eyeglasses insert through annular loops with the ear pieces tilted downwards and the eye pieces facing upwards and supported by the annular loops.

U.S. Pat. No. 3,381,806 discloses an eyeglass holder having an upper half with an aperture near the top edge and a lower half with an aperture near the lower edge with the holder made from a flexible fiber. Eyeglasses are positioned at the midsection of the holder and the two halves are brought together such that the eyeglasses are totally encased and the apertures in alignment. The aligned apertures receive a knob on the dashboard thereby providing support for the eyeglass holder and the encased eyeglasses.

U.S. Pat. No. 2,884,219 discloses a clip for holding eyeglasses to support the eyeglasses for display in optician's dispensing cabinet. Eyeglasses are loosely positioned in a clip assembly to secure the eyeglasses in a motionless display case.

U.S. Pat. No. 2,826,387 discloses a holder for glasses that attaches to the sun visor of a motor vehicle windshield. The holder includes a spring clip that receives the lower edge of a sun visor thereby securing the holder to the visor. Eyeglasses insert in slots formed in the holder. The sun visor is then rotated upward thereby positioning the eyeglasses and holder between the sun visor and ceiling or the motor vehicle.

U.S. Pat. No. 2,467,251 discloses an eyeglass holder that includes a suction cup to mount the holder to a flat smooth surface and a pair of jaws integrally mounted to the suction cup to hold eyeglasses adjacent to the surface to which the suction cup is attached. The jaws of the holder grasp and secure the bridge joining the two eye pieces together. The earpieces are not secured which allows the earpieces to move to or away from the eye pieces until another object restricts further movement.

SUMMARY OF THE INVENTION

It is an object of this invention to provide a holder for eyeglasses mountable on the interior portion of an automobile dashboard or other item with an elongated panel having a loop projecting outwardly near the top to receive the shank of the downwardly extending ear piece portion of the frame with the frame hanging on the projecting loop at the hinged connection of the ear piece to the eyeglass portion of the frame.

It is an object of this invention to provide a holder for eyeglasses mountable on the interior portion of an automobile dashboard or other item with a foldover flap at the lower portion of the elongated panel permanently connected at one side edge of the elongated panel to form a flexible hinge with the foldover flap having Velcro fasteners along the inwardly facing free end of the flap.

It is an object of this invention to provide a holder for eyeglasses mountable on the interior portion of an automobile dashboard or other item with the elongated panel including a backside having an adhesive strip to secure the panel to the dash or any other interior portion of a car or other item to which the holder is attached.

BRIEF DESCRIPTION OF THE DRAWING

FIG. 3 is a side elevation view of the holder for eyeglasses shown in FIG. 1.

FIG. 4 is a side elevation view of the holder for eyeglasses shown in FIG. 2.

DESCRIPTION OF PREFERRED EMBODIMENT

Figure 1:
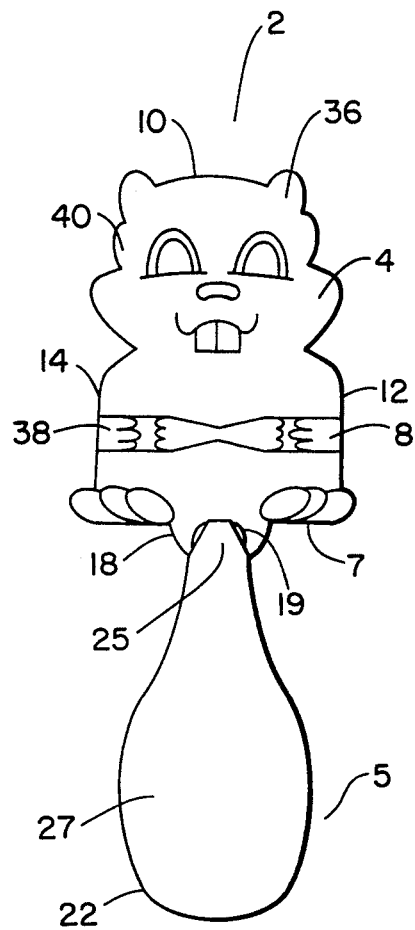
FIG. 1 is a front elevation view of a holder for eyeglasses for attaching to a car's dashboard with the eyeglasses removed in accordance with this invention.

A holder for eyeglasses 2 mountable on the interior portion of an automobile in accordance with the present invention includes an elongated panel 4 fabricated from plastic, substantially rectangular with a fold-over flap 5 permanently connected to the lower edge 7 to secure a set of eyeglasses 6. The elongated panel 4 could be fabricated from metal, wood or other material that is substantially rigid.

A loop 8 projects outward from the elongated panel 4 near the lower edge 7 of the panel 4. The loop 8 extends from the first longitudinal side edge 12 of the panel 4 to the second longitudinal side edge 14 of the panel 4 and extends outward from the panel 4 a distance large enough to allow the downwardly extending ear piece 16 of the eyeglasses 6 to insert between the loop 8 and the elongated panel 4. The loop 8 has a small lateral dimension and a small depth with said dimension set to support the weight of the eyeglasses 6 hanging therefrom. The loop 8 when viewed from the top 10 of the panel 4 may be rectangular, oval or circular in design so long as the downwardly extending ear piece 16 of the eyeglasses 6 inserts between the loop 8 and the panel 4.

The fold-over flap 5 is connected to the lower edge 7 of the elongated panel 4. A small extension 18 is integrally joined to the lower edge 7 of the panel 4 with said extension 18 being semicircular in design and having a small aperture 19 to receive the fold-over flap 5. The fold-over flap 5 includes a first member 20 and second member 22 with the first member 20 having Velcro fasteners on one side 21 and the second member 22 having Velcro on one side 23 which receives and attaches to the corresponding Velcro fasteners. Each member 20 and 22 is identical in size and each has a tapered cut with a small end 24 and 25 small enough to insert through the aperture 19 and a large end 26 and 27 large enough to secure a set of eyeglasses 6 when the fold over flap 5 is folded over an intermediate portion of the downwardly facing shank 28 and the upwardly facing shank 30 of the eyeglasses 6.

The small end 24 of the first member 20 of the fold-over flap 5 is inserted through the aperture 19 of extension 18 with the first Velcro fastener 21 facing forward. The small end 25 of the second member 22 of the fold-over flap 5 is permanently joined to the small end 24 of the first member 20 with the second Velcro fastener 23 of the second member 22 facing the first Velcro fastener 21 of the first member 20.

The fold-over flap 5 is held relatively stationary in relation to the elongated panel due to the rigidity of the Velcro fastener and due to the tapered cut of the first member 20 and second member 22 through the aperture 19 which when passed and joined together at the small ends 24 and 25 maintains the position of the elongated panel 4 at the joined ends 24 and 25 of the members 20 and 22.

An adhesive strip 32 is attached to the dashboard side 34 of the elongated panel 4. The strip is utilized to attach the holder 2 assembly to the dashboard of an automobile. The strip 32 must be strong enough to support the weight of the eyeglass holder and eyeglasses when the automobile is in motion and strong vibrations are experienced due to a rough road.

Figure 2:
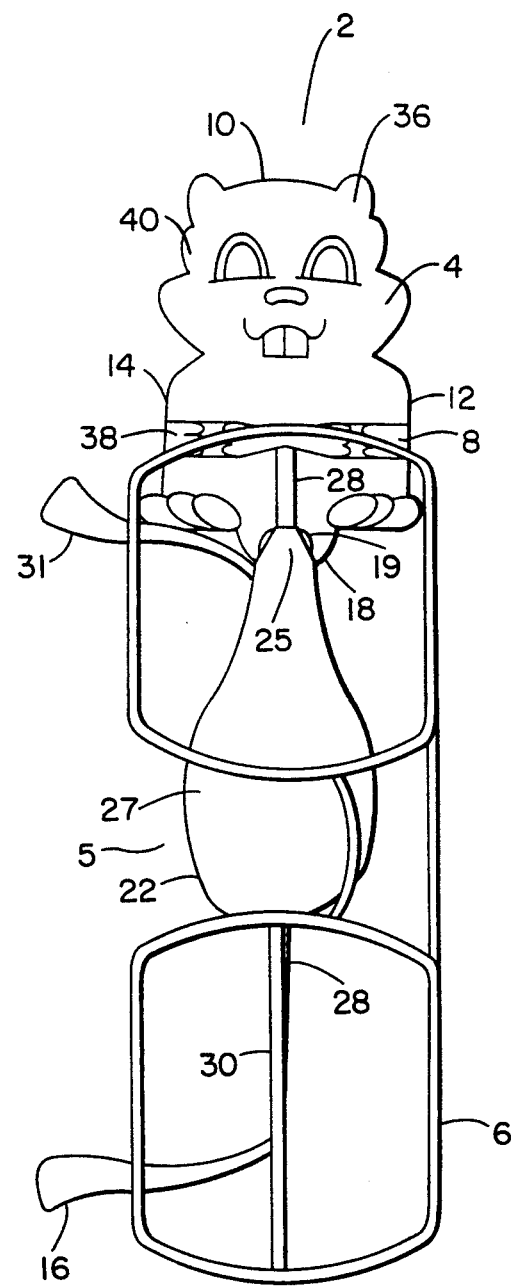
FIG. 2 is a front elevation view of a holder for eyeglasses for attaching to a car's dashboard with the eyeglasses included in accordance with this invention.

The front side 36 of the elongated panel 4 and the front side 38 of the loop 8 are relatively smooth to allow small decorations to be attached to the front sides 36 and 38 of the panel 4 and loop 8. FIG. 1 & FIG. 2 show a beaver 40 illustrated on the panel 4 and loop 8.

The holder 2 operates by attaching the elongated panel 4 to a smooth, clean portion of the dashboard of an automobile with the holder 2 within reach of the driver when the driver is positioned behind the wheel. A set of eyeglasses are positioned on the holder such that the downwardly extending ear piece 16 is inserted between the loop 8 and the elongated panel 4. The glasses are lowered until the hinged portion 42 of the downwardly extending ear piece 16 rests upon the loop 8.

The downwardly extending shank 28 and the upwardly extending shank 30 of the upwardly extending earpiece 31 are positioned substantially vertical which allows the fold-over flap 5 to fold over both shanks 28 and 30 and maintain the shanks 28 and 30 and the eyeglasses 6 in a substantially stationary position.

The eyeglass holder in accordance with this invention may also be attached to other items besides the interior of an automobile, such as desks, refrigerators, wall panels, and even to items of wearing apparel.

I claim:

1. A holder for eyeglasses mountable on the interior portion of an automobile or other item, said holder comprising a substantially planar and substantially rigid panel having a support member extending outwardly therefrom to support a pair of eyeglasses thereon, securing means to secure said eyeglasses to said panel, and attaching means to attach said panel to said automobile dashboard or other item;

said support member having a through passageway therethrough bounded by a permanently continuous peripheral wall;

said securing means having an extension support member integrally mounted to the lower edge of said panel, a fold-over flap member to fold over and surround the ear pieces of said pair of eyeglasses, and fastening means to fasten said fold-over flaps together to hold said ear pieces of said pair of eyeglasses therebetween, said extension support member and said fold-over flap member being below said support member to hold said earpieces together at a point below the portion of said eyeglasses supported by said support member; and said fold-over flap member comprising a continuously joined length of flexible material having a narrow midsection, an enlarged first end section extending from said narrow midsection and an enlarged second end section extending from the opposite side of said narrow midsection, wherein said securing means includes an aperture in said extension support member to receive said narrow midsection of said fold-over flap member therethrough and a retaining means to retain the position of said fold-over flap member whereby said narrow midsection is retained in said aperture and said enlarged first and second end sections are retained on opposite sides of said apertures.

2. A holder for eyeglasses mountable on the interior portion of an automobile or other item as set forth in claim 1, wherein said panel includes a first side edge and a spaced apart second side edge, said support member includes a loop extending from said first side edge of said panel to said second side edge of said panel and integrally mounted thereto, said through passageway extending substantially across the entire width of said panel from said first side edge to said second side edge.

3. A holder for eyeglasses mountable on the interior portion of an automobile or other item as set forth in claim 1, wherein said retaining means includes said fold-over flap having a narrow midsection passing through said aperture, said aperture having a cross-sectional dimension larger than that of said narrow midsection but smaller than that of said enlarged first and second end sections thereby retaining the position of said fold-over flap.

4. A holder for eyeglasses mountable on the interior portion of an automobile or other item as set forth in claim 1, wherein said fold-over flap member includes a first flap and a second flap, said fastening means includes mechanical interlocking fasteners having hook projections on one side of said first flap member and Velcro fasteners having corresponding loop projections on said second flap member, said hook projections and said loop projections being in facing relationship.

5. A holder for eyeglasses mountable on the interior portion of an automobile or other item as set forth in claim 1, wherein said attaching means includes an adhesive strip fastened to one side of said panel for securing to the interior portion of an automobile or other item.

* * * * *